Jan. 7, 1958 — D. G. MAGILL ET AL — 2,819,006
COMPOSITE CONTAINER CONSTRUCTION
Filed Aug. 27, 1954 — 2 Sheets-Sheet 1
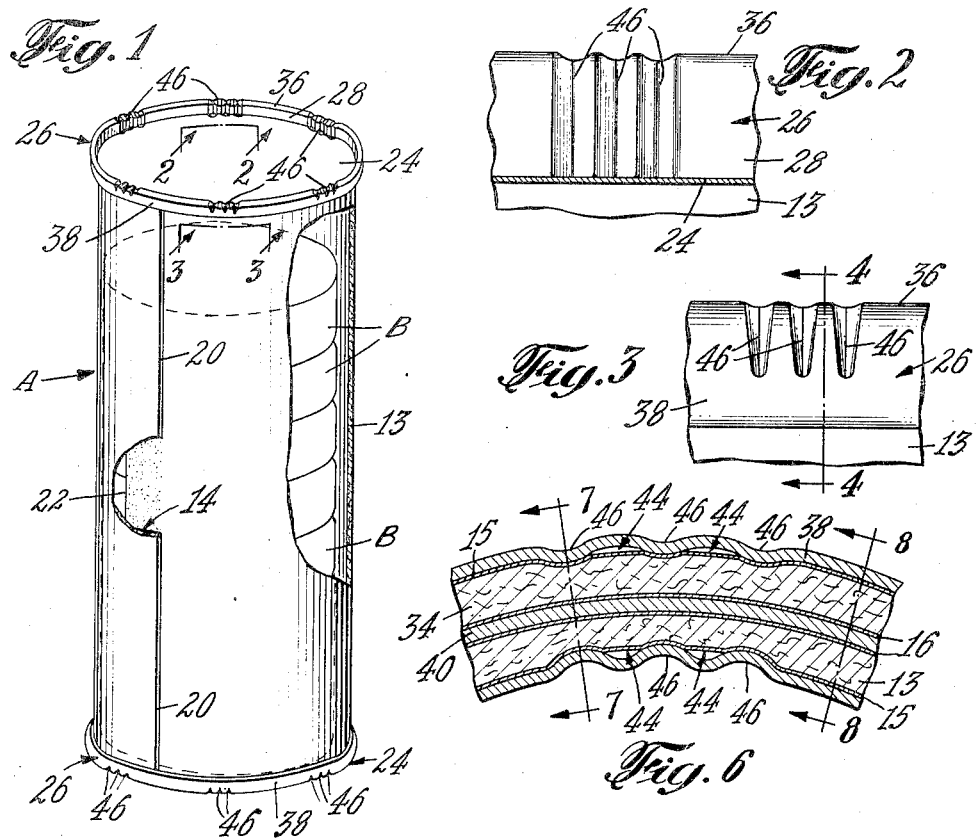
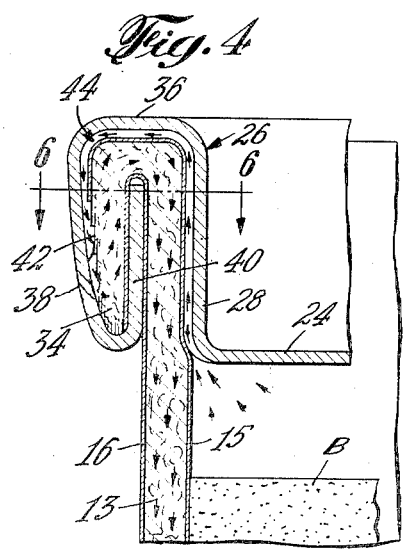
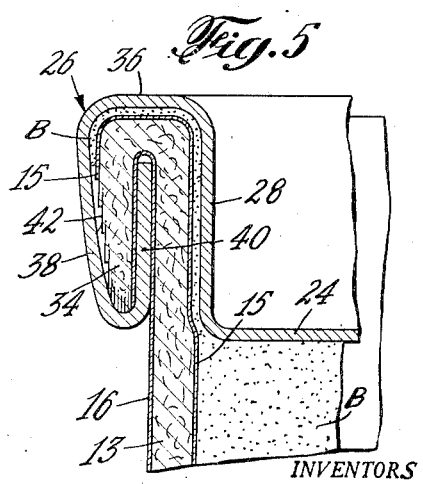
INVENTORS
DONALD G. MAGILL
HAROLD R. VITENSE
BY Charles H. Erne
Leland R. McCann
George W. Reiber
ATTORNEYS Jan. 7, 1958     D. G. MAGILL ET AL     2,819,006
COMPOSITE CONTAINER CONSTRUCTION
Filed Aug. 27, 1954     2 Sheets-Sheet 2
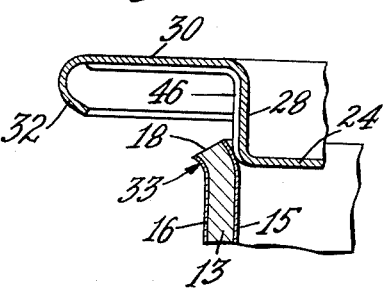
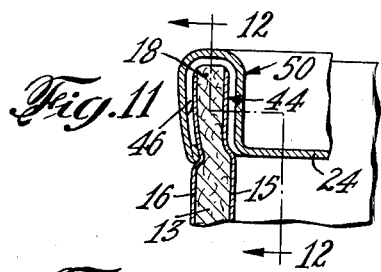
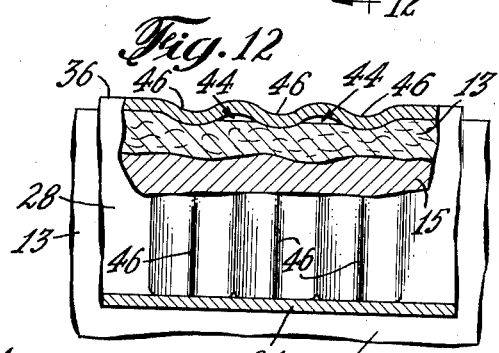
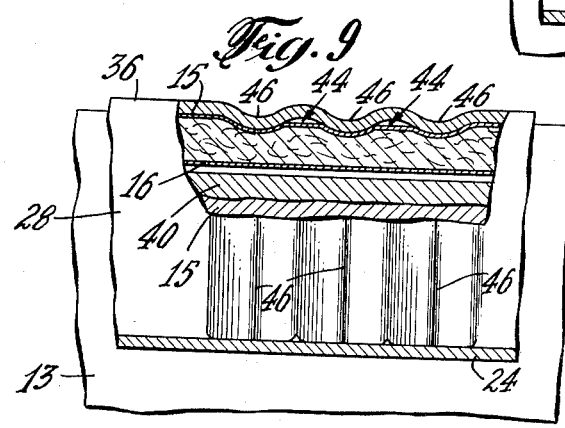
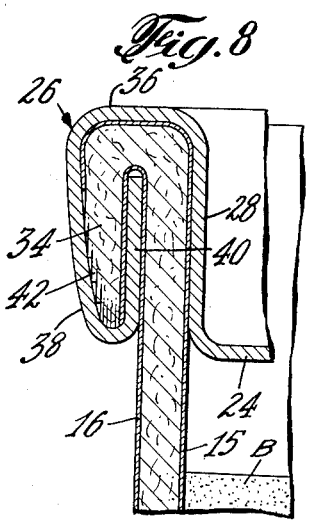
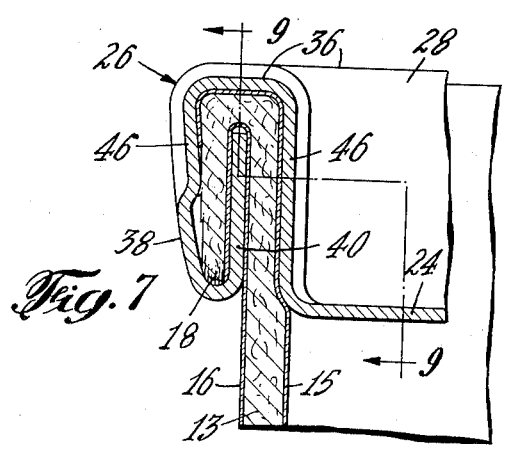
INVENTORS
DONALD G. MAGILL
HAROLD R. VITENSE
BY
Charles H. Erne
Leland R. McCann
George W. Reiber
ATTORNEYS

United States Patent Office 2,819,006
Patented Jan. 7, 1958

2,819,006

COMPOSITE CONTAINER CONSTRUCTION

Donald G. Magill, Great Neck, N. Y., and Harold R. Vitense, Berwyn, Ill., assignors to American Can Company, New York, N. Y., a corporation of New Jersey Application August 27, 1954, Serial No. 452,546

5 Claims. (Cl. 229—5.5)

The present invention relates to composite containers suitable for the packaging of pressure-generating products such as leavened biscuit dough and has particular reference to a sealed container in which the end seams are provided with venting ducts or channels which bring the interior of the container into communication with gas-absorptive surfaces of the fibre body within the end seams to facilitate the expulsion of gases from the interior of the container.

Biscuit dough containing a leavening agent has been marketed for many years by packing a stack of refrigerated individual cakes or pellets in oversized containers to permit of partial rising or expansion of the dough within the containers after they are sealed. As a result, a quantity of air is entrapped within the containers. This initial rising of the dough is effected by proofing the sealed containers by maintaining them at substantially room temperature to permit the leavening agent to react with the moisture in the dough and produce a gas, usually $CO_2$, which remains occluded or dispersed within the dough and causes it to rise until it fills the container and expels the entrapped air. The proofing is continued until a desired pressure of from 15 to 20 pounds per square inch is created within the container. After this desired pressure has been obtained, the package is refrigerated to halt the evolution of gas by the leavening agent and is thereafter maintained under refrigeration until it is opened by the ultimate consumer and the cakes prepared for baking.

In order to provide for the expulsion of the entrapped air hereinbefore mentioned a small vent hole was provided in the end of the containers but it was found that the dough itself was forced through this hole by the gas pressure and thereby produced a messy undesirable collection of dough on the outside of the container. This usual practice was to pack the dough in containers having thick or heavy spirally wound fibre bodies and crimped-on metal end members, the body material being pervious to permit the entrapped air to be forced through the walls to the exterior of the containers. To protect the walls from the moisture in the dough cakes, the cakes in some cases were wrapped in a suitable loose, unsealed wrapper before being inserted into the container. More often the interior of the body was lined with a spirally wound metal foil liner having overlapped edges which permitted the passage of the entrapped air to the pervious body walls.

However it has been found that in many cases the crimped-on members were blown off by the internal pressure in the containers and to prevent this an excessively heavy or thick body wall was required to hold the ends in place. It was also found that the pervious body wall also permitted passage therethrough of some of the $CO_2$ gas created by the leavening agent with the result that the dough cakes failed to rise properly when the containers were opened by the consumer.

To overcome these difficulties, the instant invention contemplates a major improvement over the present biscuit dough container by providing a fibre container having an impervious inner wall and metal end members secured thereto in end seams which contain venting ducts or channels which permit the initially expanding dough to force the entrapped air from the interior of the container into the interior of the end seams and thence into the interstices between the fibres of the container body wall. With this type of venting means, the ducts after permitting passage of the entrapped air, become plugged up by the expanding dough and thus the undesired escape of the leavening gas is prevented. Since the channels extend only into the interior of the end seams, the dough cannot be forced to the outside of the container, and thus the neat, attractive appearance of the container is maintained. This form of venting means also makes possible the use of an impervious coating on the inner wall of the body and this in turn provides for the use of a thinner, denser, more economical and more readily worked body material which permits of the more secure attachment of the end members thereto.

An object of the present invention, therefore, is the provision of an improved biscuit dough container having an end seam construction which makes possible the dispersion of the entrapped air into the fibrous structure of the container body wall through the end seam as such air is expelled by the rising biscuit dough.

Another object is the provision of a vented end seam which makes possible the use of a fibre container body having an impervious inner surface.

Another object is the provision of an improved composite biscuit dough container construction which provides for the expulsion of entrapped air and yet creates no new raw edges in either the metal ends of the fibre body, thereby overcoming the ever-present problems of rusting of the metal parts or softening of the fibre parts due to the action of the moist product or the condensation of the refrigerated atmosphere to which the container must necessarily be subjected.

Still another object is the provision of an improved end seam construction which provides for the venting of entrapped air from a sealed container without requiring an external opening in any wall of the container through which the product or certain components of the product may escape to mar the appearance of the package.

Another object is the provision of a vented container which, while particularly suitable for packaging leavened biscuit dough, is also suitable for the packing of a variety of products which generate a gas which must be vented from the interior of the container.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a sealed container embodying the instant invention, parts being broken away;

Fig. 2 is an enlarged vertical sectional detail taken substantially along a plane indicated by the line 2—2 in Fig. 1;

Fig. 3 is an enlarged side elevation taken substantially along a plane indicated by the line 3—3 in Fig. 1;

Fig. 4 is an enlarged sectional detail taken substantially along the line 4—4 in Fig. 3, parts being broken away;

Fig. 5 is a view similar to Fig. 4 showing the venting channel plugged up by the expanded biscuit dough after the entrapped air has been expelled from the interior of the container;

Fig. 6 is a sectional detail taken substantially along the line 6—6 in Fig. 4, parts being broken away;

Figs. 7 and 8 are sectional details taken substantially along the lines 7—7 and 8—8, respectively, in Fig. 6, parts being broken away;

Fig. 9 is a view taken substantially along the line 9—9 in Fig. 7, parts being shown in section and parts being broken away;

Fig. 10 is a fragmentary sectional detail taken substantially through the marginal portions of the container body and an end closure member preparatory to the formation of the end seam shown in Figs. 1 through 9;

Fig. 11 is a sectional detail, comparable to that shown in Fig. 4, illustrating a modified form of the invention, and Fig. 12 is a view taken substantially along the line 12—12 in Fig. 11, parts being broken away.

As a preferred or exemplary embodiment of the instant invention, the drawings illustrate a composite container A which is adapted to contain a stack of cakes or pellets of leavened biscuit dough B. The container A includes a tubular fibre body 13, preferably circular in cross-section, which is formed with an adhesive-bonded, lap type longitudinal side seam 14 (see Fig. 1). The container body 13 is made from any suitable fibrous stock, such as Fourdrinier or cylinder stock, which normally is formed with interstices between the fibres and thus is somewhat porous and permeable to gas. In order to protect the body 13 from the ingredients of the biscuit dough B and to prevent the undesired escape of the $CO_2$ which is evolved during the proofing of the biscuits, its interior surface is provided with a coating or lining 15 (see Figs. 4 through 10) of a suitable greaseproof, waterproof, moistureproof, and gasproof material such as aluminum foil or polyvinylidine chloride, which latter is commonly known as "Saran." If desired, the outer surface of the container body 13 may be coated with a moistureproof and waterproof outer lining 16 such as a vinyl base lacquer to protect it from the condensation of atmospheric moisture. The outer lining 16, may if desired, take the form of a label made of a suitable material such as foil, cellophane, or glassine.

Since the blank from which the body 13 is made is usually cut from a large sheet, its edges are raw and unprotected. As a result, the end edges 18 (see Fig. 10) and the edge 20 (see Fig. 1) of the outer lap of the body side seam 14 of the finished container remain raw and permeable to gas. The edge 22 (see Fig. 1) of the inner lap of the side seam 14 is, however, preferably sealed with a film (not shown) of a moistureproof, waterproof, greaseproof, and gasproof material such as "Saran" or a plasticized microcrystalline wax in order to maintain the continuity of the interior protective lining 15.

The container A also includes a pair of metallic end closure members 24 which are secured to the body 13 in strong, pressure-resistant, air tight end seams 26, preferably double seams made in accordance with the teachings of D. G. Magill et al. Patent 2,633,095 issued March 31, 1953, and entitled "Method of Forming End Seams in Composite Containers."

Each end closure member 24 (see Fig. 10) is initially formed with an upright countersink wall 28 having an external diameter substantially equal to the internal diameter of the body 13, and a horizontal marginal flange 30 which terminates in an open flange curl 32. In forming an end seam 26, the closure member 24 is positioned on an end of the container body 13 which has previously been slightly flared as at 33 (see Fig. 10) and a relative longitudinal movement is effected between the body 13 and the closure member 24 to force the body against the closure and thus reshape the marginal edge portion of the body 13 into a marginal flange 34 (Figs. 4, 5, 7 and 8). This relative movement is continued until the raw edge 18 of the body 13 reaches the closure curl 32, after which the body flange 34 and closure flange 30 are folded downwardly to form the double seam 26.

During this folding operation the closure flange 30 and curl 32 are reshaped to form a horizontal portion 36, which constitutes the top of the seam 26, a depending portion 38 which constitutes the outside of the seam, and a closure hook portion 40 which is positioned within the seam. The countersink wall 28 of the end closure member 24, at the conclusion of the seaming operation, extends into the body 13 and forms the inside wall of the end seam 26. The normal cross-section of the seam 26 is illustrated in Fig. 8.

During this seaming operation, the marginal flange 34 of the body 13 is bent through an angle of 180° and folded back upon the body (see Figs. 4, 7, 8). As a result of the unequal distances through which the various portions of the flange 34 are bent during this folding, shearing stresses are set up within the flange which result in the sliding of the fibres of the flange upon each other. This causes a splitting or delamination of the fibrous stock of the marginal edge portion of the flange 34, and thus a comparatively large surface (generally designated by the numeral 42) of uncoated absorptive fibres is created within the seam 26. It will be noted that this surface 42 may include a portion of the raw edge 18.

In actual practice, the bottom closure member is first seamed onto the body 13 and the biscuit dough B, which has heretofore been held at refrigerating temperatures, is placed within the container, after which the upper closure member is attached. As seen in Fig. 1, the biscuit dough B does not fill the container A, and thus the air which surrounds the dough is entrapped within the container when the upper closure member is seamed on. The biscuit dough in the closed container is now put through a proofing period during which the container and contents are held at room temperature for one or two hours during which time the leavening gas is generated within the biscuit dough B. This gas is, of course, produced throughout the biscuit dough B and thus causes it to swell and rise evenly. In order to permit the dough to rise sufficiently to fill the container A, provision must be made to permit the venting or expulsion of the air which is entrapped within the container. If this air is not vented, it becomes compressed and prematurely stops the expansion of the biscuit dough B, which ultimately results in the production of unpalatable baked biscuits after the container is opened by the consumer.

In the present invention, provision is made for venting the entrapped air from the interior of the sealed container A into the interstices between the fibres of the container body 13. This is done by providing venting channels 44 (see Figs. 4, 6, 9) within the end seams 26 to bring the interior of the container into communication with the delaminated, absorptive surface 42 of the marginal body flange 34. To create these venting channels 44, each metallic end closure member 24, prior to being seamed onto the body 13, is provided with spaced groups of substantially radial indentations 46 (see Fig. 10) which extend across the full height of countersink wall 28 and across the closure flange 30 to the base of the curl 32.

During the reshaping of the marginal portions of the end closure member 24 and the body 13 in the double seaming operation, the indentations 46 are embedded in and thus compress or pinch the adjacent fibrous stock (see Figs. 6, 7 and 9). Since the indentations 46 in each group are closely spaced, the compressional effect of the indentations 46 extends to the fibrous body stock between them and thus this stock is forced or spaced away from the closure member at these intermediate areas (see Figs. 4, 6 and 9) and the venting channels 44 are created. The fact that the indentations 46 are depressed into the seam 26 prevents them from being obliterated during the double seaming operation, although their outer extremities may be somewhat ironed out by the pressure of the seaming rolls.

The venting channels 44 thus created within the double seam 26 by the indentations 46 extend from the interior of the container A to the delaminated surface 42 of the body flange 34 (see Fig. 4). Thus, when the biscuit dough B expands during the proofing period, the air which was entrapped within the container is forced through the channels 44 into the interior of the end seam 26. When this air reaches the absorptive, delaminated body flange surface 42, it passes into the body stock and disperses in the interstices between the fibres of the stock. The path of the air from the interior of the container A into the fibrous stock of the body 13 is indicated by the small arrows in Fig. 4. This expulsion of air from the interior of the container A and its dispersion into the body stock continues until the biscuit dough B fills the container and thus completely displaces all of the entrapped air. The proofing period is continued, however, until an internal pressure of 15 to 20 pounds per square inch is built up within the biscuits by the leavening gas. The end seam 26 is, of course, strong enough to hold this pressure. As this internal pressure builds up, some of the biscuit dough B is forced up into the channels 44 (see Fig. 5) thereby plugging up the channels and preventing the escape of the leavening gas. Because the venting channels 44 terminate adjacent the delaminated surface 42, and thereby do not extend entirely through the seam 26, the dough B is prevented from being forced out of the seam onto the outer surfaces of the container.

The air which has been driven from the interior of the container A and dispersed within the interstices of the body stock, may, if not too great in volume, remain there. However, if the volume of the expelled air is too great to be absorbed by the fibrous stock, the excess may escape to the outside atmosphere through the external raw edge 20 of the body side seam 14. Since the external body coating 16 is not gasproof, or in the event it has been omitted from the container, the excess expelled air may also escape through the exterior surface of the body 13. In any event, all of the entrapped air is vented from the interior of the container A and the biscuit dough B is enabled to fully rise and attain the pressurized condition necessary to produce good baked biscuits.

It will be obvious that the closely spaced indentations 46 can be extended completely around the end seam 26 instead of being arranged in the spaced groups shown in the drawings. However, the group arrangement has been found to offer sufficient venting capacity under actual operating conditions. It is also obvious that the indentations 46 may be formed in only one of the end closure members of the container A.

Figs. 11 and 12 show a modified form of the invention as applied to a single, crimped seam 50 in which the marginal flange of the end closure member 24 is folded around the marginal edge of the body 13. In this construction, the end seam 50 is provided with the same groups of identations 46 as the double seam 26 and the same venting channels 44 are produced in the body 13 during the seaming operation as a result of the compression of the body stock by the indentations 46. However since the marginal portion of the body 13 is not bent back upon itself, no delamination of the fibres takes place. Instead, the expelled air gains access to the body interstices through the portions of the raw body edge 18 which are in communication with the channels 44, as indicated by the arrows in Fig. 11.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A sealed container for packaging pressure-generating products, comprising a tubular fibrous body having a gas proof lining material on its interior surface and having a gas permeable raw edge at one end thereof, and a metal end member secured to said body, said end member having a peripheral countersink wall seated within an end of said body, marginal portions of said metal end member and said tubular fibrous body being interfolded in an end seam wherein the interior fibres of said tubular body are exposed at said raw edge thereof, peripherally spaced marginal portions of said metal end member embodied in said end seam being laterally offset and spaced outwardly from said body to provide a plurality of continuous open channels extending entirely through said end member countersink wall in a direction axially of said tubular body and thence radially outwardly and axially inwardly around said interfolded end seam, said open channels terminating adjacent said raw edge of said tubular fibrous body, whereby to enable entrapped gas to pass freely from the interior of said container into the interior of said end seam and thence through said raw body edge into the interstices between the fibres of the body to be absorbed thereby.

2. A sealed container for packaging pressure-generating products, comprising a tubular fibrous body having an interior surface impermeable to gas, and a metal end member secured to said body and having a countersink wall seated within an end thereof, marginal flange portions of said end member and said body being interfolded in an end seam wherein said marginal body flange is folded reversely to effect a delamination thereof adjacent its terminal edge to expose the interior fibres of said body, peripherally spaced portions of said metal end member embodied in said end seam being radially offset and spaced from said body to provide a plurality of continuous open channels extending entirely through said end member countersink wall in a direction axially of said body and thence radially outwardly and axially inwardly around said interfolded end seam and terminating adjacent the delaminated portions of said body flange, whereby to enable entrapped gas to pass without obstruction from the interior of said container into the interior of said end seam and thence through said delaminated body portion into the interstices between the fibres of said body to be absorbed thereby.

3. A sealed container for packaging pressure-generating products, comprising a tubular fibrous body having an interior surface impermeable to gas, and a metal end member secured to said body, said end member having a cylindrical countersink wall seated within an end of said body, marginal flange portions of said end member and said fibrous body being interfolded in an end seam wherein said body flange extends reversely and axially of said body in a delaminated peripheral edge to expose the interior fibres of said tubular body, marginal portions of said metal end member embodied in said end seam being radially offset and spaced from said body to provide a plurality of peripherally spaced continuous open channels extending entirely through said countersink wall of said end member in a direction axially of said tubular body and thence radially outwardly and axially inwardly around said interfolded end seam and terminating adjacent said delaminated peripheral fibrous body edge, whereby to enable entrapped gas to freely pass from the interior of said sealed container into and partially around said end seam and thence through said delaminated body edge into the interstices between the fibres of said body to be absorbed thereby.

4. A sealed container adapted for the packaging of pressure-generating products comprising a tubular fibrous body having its interior surface impermeable to gas, a metallic end closure member, said closure member having a countersink wall extending into said body, marginal flange portions of said closure member and said body being interfolded to provide an end seam wherein said marginal flange of said body is folded back upon said body to effect a delamination of a portion of said fibrous body adjacent its edge to expose the interior fibres of said body, and at least one pair of closely spaced indentations formed in said metallic end closure member and extending through said countersink wall and around said marginal flange portion of said closure member to adjacent said delaminated body portion, the fibrous body between said indentations being compressed by said indentations and spaced from adjacent portions of said metallic end closure member to provide a plurality of continuous open channels leading from the interior of said container to said delaminated portion of said body flange, whereby to enable entrapped gas to pass from the interior of said container through said open channels into the interior of said end seam and thence through said delaminated body portion into the interstices between the fibres of said body.

5. The container of claim 4 wherein said indentations are arranged in radially extending groups spaced peripherally around said end seam, each group comprising at least two closely spaced indentations forming said open channels therebetween.

References Cited in the file of this patent
UNITED STATES PATENTS

| | | |
|---|---|---|
| 709,017 | Kuechenmiester | Sept. 16, 1902 |
| 2,005,055 | Sprague | June 18, 1935 |
| 2,022,780 | Peters | Dec. 3, 1935 |
| 2,164,055 | Ellstrom | June 27, 1939 |
| 2,343,550 | Grove | Mar. 7, 1944 |
| 2,633,095 | Magill | Mar. 31, 1953 |
| 2,695,847 | Fisher | Nov. 30, 1954 |